Dec. 15, 1959   R. N. JANEWAY   2,917,007
RAILWAY TRUCK THRUST LINK
Filed Jan. 24, 1957   3 Sheets-Sheet 3
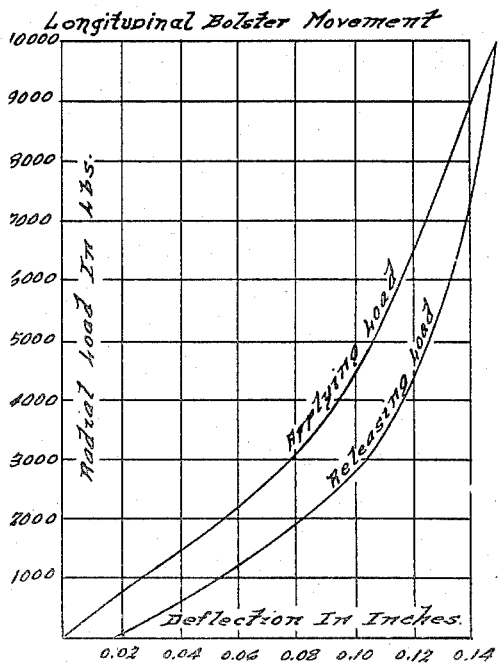
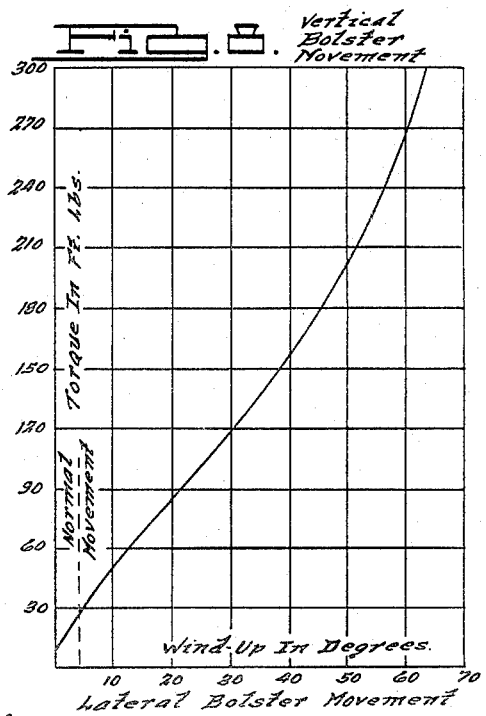
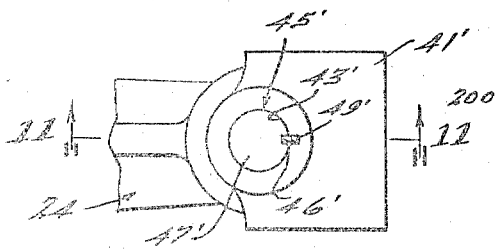
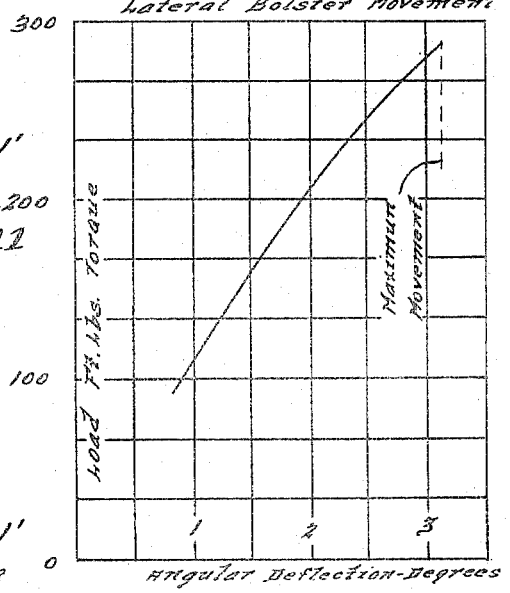
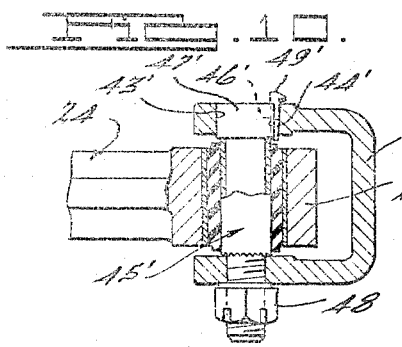
INVENTOR.
Robert N. Janeway.
BY
George W. Talbutt
ATTORNEY.

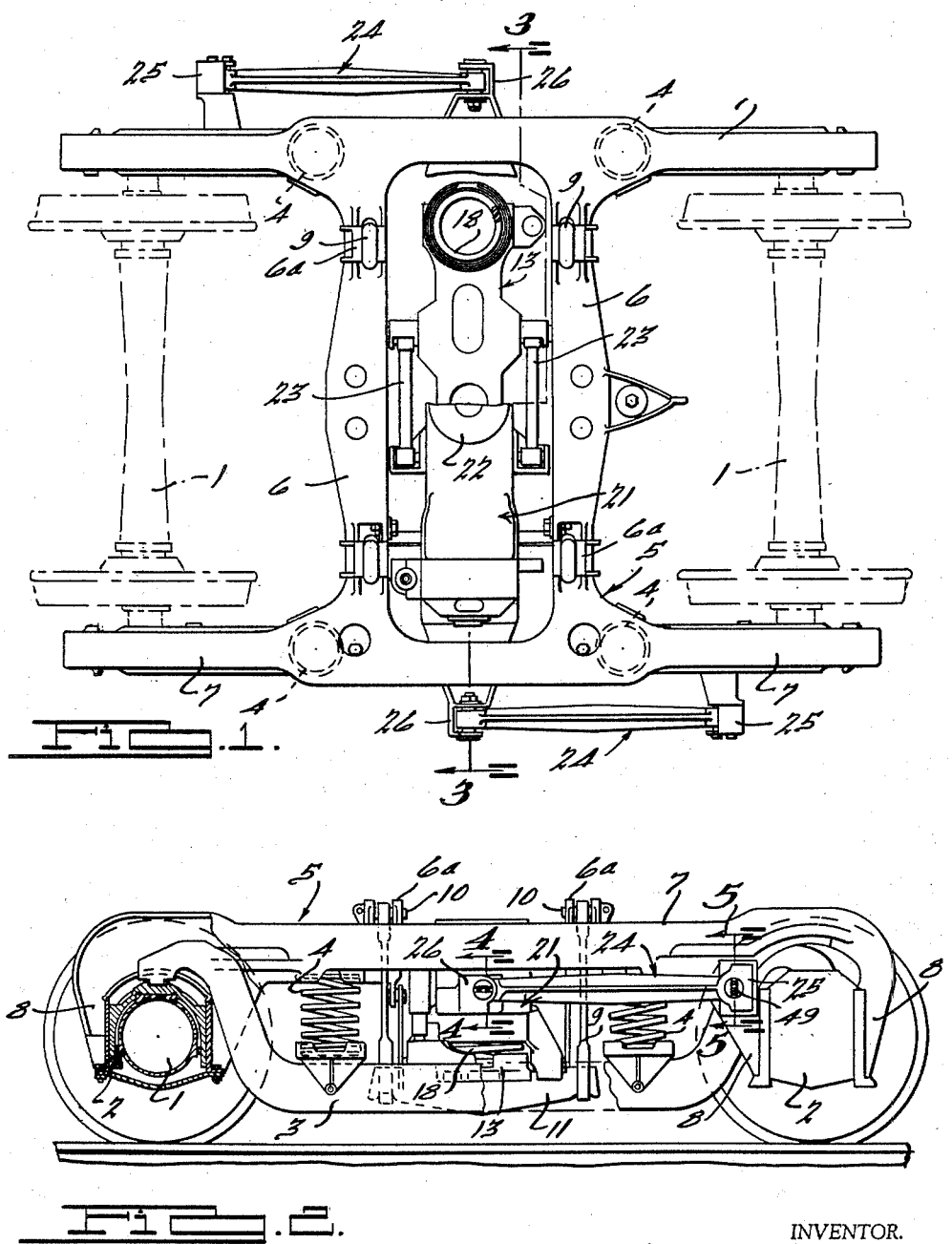

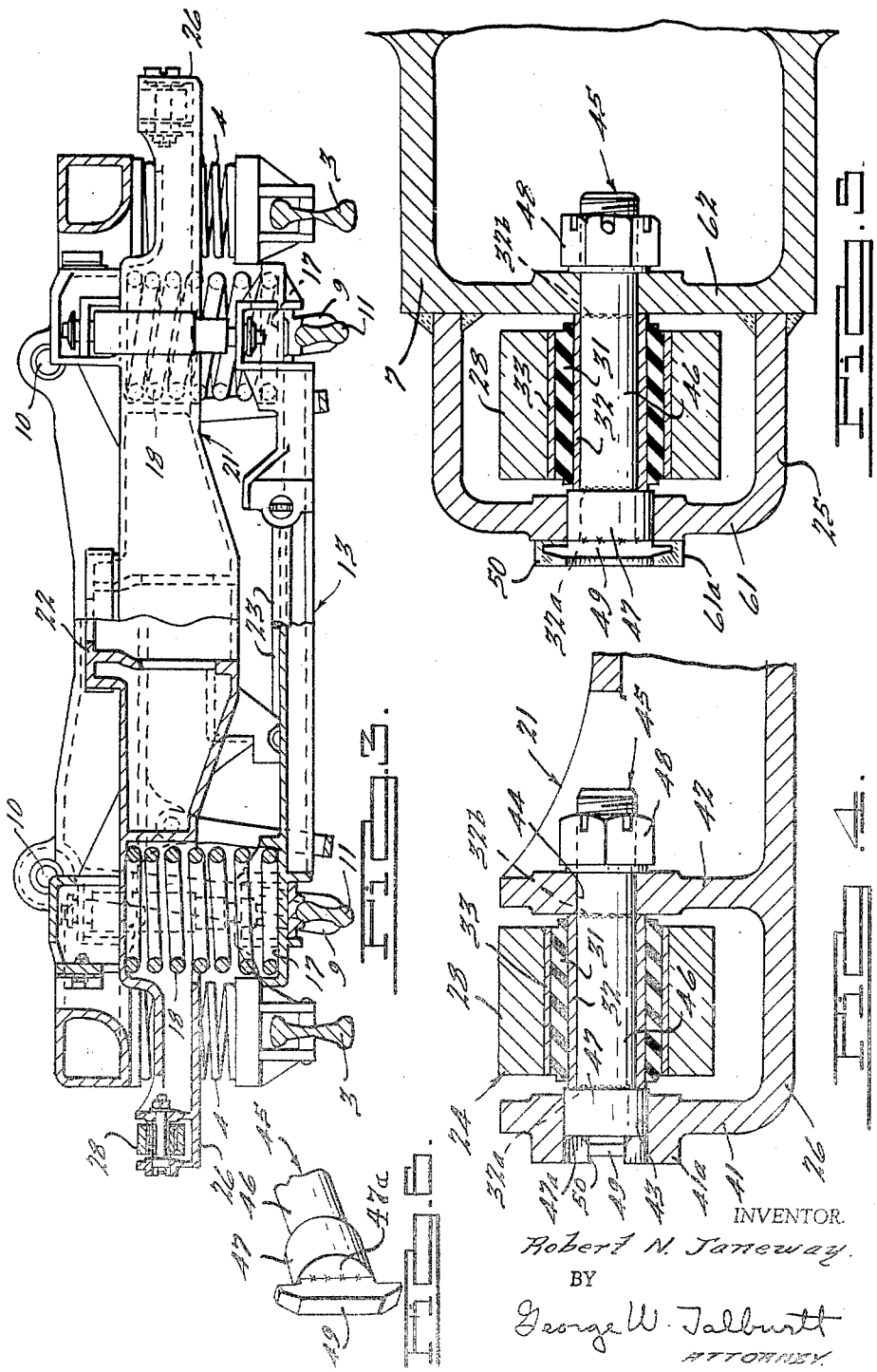

United States Patent Office 2,917,007
Patented Dec. 15, 1959

2,917,007

RAILWAY TRUCK THRUST LINK

Robert N. Janeway, Detroit, Mich.

Application January 24, 1957, Serial No. 635,991

8 Claims. (Cl. 105—200)

My invention relates to railway equipment and pertains particularly to an improvement in bolster thrust links for use on railway trucks. It is the basic objective of this bolster thrust link to stabilize the bolster against thrusts directed longitudinally of the railway truck without imposing any appreciable restraint on the bolster movement in other directions.

One object of my invention is to provide a novel type of mechanism to prevent the bolster of a truck from frictionally engaging any portion of the truck frame during normal operation and at the same time permit free relative vertical and lateral movement therebetween.

Another object of my invention consists in providing a novel means whereby a truck bolster is permitted to move freely with respect to the associated truck frame in both vertical and lateral directions, and is permitted to move longitudinally of the truck frame to only a limited degree from a central position thereon, such longitudinal movement being resiliently opposed.

It is still another object of this invention to provide a bolster thrust link that utilizes rubber insulated end connections to effectively prevent the transmission of noise between the elements connected by the thrust link. The absence of metal to metal contact in the thrust link end connections and safe loading of the rubber thereof ensures long service life without maintenance.

It is still another object of this invention to provide a bolster thrust link design that is of the simplest and most economical construction yet one that will meet all the requirements for optimum riding quality and maintenance free service in a wide range of applications.

This invention is an improvement over the construction shown in my Patent 2,255,619 dated September 9, 1941.

Fig. 1 is a top plan view showing a railway truck embodying the invention;

Fig. 2 is a side elevation thereof;

Fig. 3 is a detail transverse vertical section taken approximately on line 3—3 of Figure 1 and drawn to enlarged scale;

Fig. 4 is an enlarged sectional elevational view of the bolster end connection to the bolster thrust link, the view being taken along the line 4—4 of Fig. 2;

Fig. 5 is another enlarged sectional elevational view of the frame to thrust link end connection, the view being taken along the line 5—5 of Fig. 2;

Fig. 6 is an enlarged, fragmentary perspective view of the head end of one of the bushing mounting bolts;

Fig. 7 is a graph showing the direct compression loading of the resilient sleeve of the bushing unit during horizontal movement of the truck bolster longitudinally of the truck;

Fig. 8 is a graph showing the shear loading of the resilient sleeve of the bushing unit during vertical movement of the truck bolster;

Fig. 9 is a graph showing the twist or conical loading of the resilient sleeve of the bushing unit during lateral movement of the truck bolster;

Fig. 10 is a side elevational view of a modified form of anchor means for the thrust link pivot bolts; and Fig. 11 is a fragmentary sectional view taken along the line 11—11 of Fig. 10.

The railway truck illustrated in Figures 1, 2 and 3 comprises the wheel and axle assemblies 1, journal boxes 2, longitudinal equalizers 3 carried on the boxes 2, equalizer springs 4, and truck frame 5. Frame 5 preferably consists of a one-piece casting including transversely extending, spaced, transoms 6 and longitudinally extending wheel pieces 7 with depending pedestal legs 8 receiving the journal boxes 2 between them. The journal box per se (see Fig. 2) includes a modified form of the invention covered by Robert N. Janeway Patent 2,668,505 which is distinct from the invention herein claimed. This modified form of journal box is designed for application to a pedestal-type truck. The herein disclosed truck is of the lateral motion bolster type and has pairs of swing hangers 9 at opposite sides of the truck pivotally suspended by pins 10 from brackets 6a extending upwardly from the transom pieces 6. Each pair of hangers 9 carries a cross bar 11 which supports the adjacent end of a spring plank 13. A spring unit 18 is mounted on the spring seat member 17 on each end of the spring plank 13 to support the adjacent end of a bolster 21 having a center plate 22 on which is mounted a vehicle body (not shown). Thrust links 23, extending transversely of the truck, are connected by resilient pivot connections at their opposite ends to the plank 13 and bolster 21. These thrust links 23 limit the relative movement between the bolster 21 and spring plank 13. The resilient pivot connections at the ends of the thrust links 23 may be the same as those shown (Figs. 4 and 5) and described in detail with respect to the bolster thrust link 24.

A longitudinally extending bolster thrust link 24 at each side of the truck is attached at one end to an integral substantially U-shaped bracket 26 on the adjacent end of bolster 21 and at the other end to a substantially U-shaped bracket 25 rigid with and extending outwardly of truck frame wheel piece 7. The bolster thrust links 24 position the bolster with respect to the frame transoms and eliminate the necessity for metal-to-metal guiding contact between the bolster and transom frame that would otherwise be necessary. Elimination of this metal-to-metal contact eliminates noise and improves the car ride.

The invention claimed herewith relates generally to the bolster thrust links 24 and specifically to the end connections of the bolster thrust links. It will be noted that each end of the bolster thrust link 24 is formed with an eye 28. Pressed into each link eye 28 is a resilient insulator bushing that has become known in the trade as a "Silentbloc" type of bushing. These "Silentbloc" bushings each consist of a rubber-like sleeve or bushing 31 that is confined under high pressure in the annular space between a pair of concentrically arranged, spaced, inner and outer metal sleeves 32 and 33 respectively. The high pressure on the rubber-like sleeve 31 gives it an effective adhesion to the metal sleeves 32, 33 so that the rubber-like sleeve 31 withstands a high shearing displacement without slip relative to the rigid metal sleeves 32, 33. Accordingly, there is no abrasion action to wear the rubber-like sleeve 31. Although the shear resistance about the longitudinal axis of the bushing is low, still, the radial stiffness of bushing 31 and its resistance to twist in the plane of the bushing axis are relatively high. However, this resistance to twist about a vertical axis, that opposes lateral deflection of the bolster, is relatively low within the range of the bolster movement required and accordingly optimum ride is assured.

The bushing variation in resistance to bolster movement in the longitudinal, vertical and lateral directions is clearly brought out by a consideration of Figs. 7–9. From Fig. 7 it is obvious that direct radial compression loads applied to the resilient bushing 31 by horizontally extending, longitudinally directed, thrust loads are firmly opposed by the highly compressed bushing 31. Accordingly there is a minimum of movement of the bolster 21 longitudinally of the truck frame 5. However, the resilient bushings 31 are effective to cushion the longitudinal thrusts and to also insulate the bolster 21 from the truck frame 5.

A consideration of Fig. 8 brings out that vertical movement of the bolster 21 with respect to the truck frame 5 and spring plank 13 is practically unopposed by the resilient bushings 31 due to the fact that the shear resistance of the bushings 31 is insignificant within the required range of bolster movement. The bolster movement required for a truck of the disclosed type causes a relative rotation of only 4 or 5 degrees in the bushings 31 and for such angular rotation the resisting shear forces to bolster vertical movement are very low.

A consideration of Fig. 9 shows the variation in twist loading or conical loading of the resilient bushings 31 during lateral bolster movement. In a railway truck of the disclosed type, with the link proportions shown, the lateral movement permitted corresponds to link angular movement of about 3 degrees. It will be seen from Fig. 9 that the bushings 31 will permit a resiliently opposed movement without interfering with the relatively free, frame insulated vertical bolster movement.

It is thought to be evident to all from the foregoing that, to shear the rubber-like bushing sleeve 31, the inner metal sleeve 32 must be locked to its support bracket 25 or 26 while the outer metal sleeve 33 must be held securely in the eye portion 28 of the thrust link 24. While it is simple to press the bushing outer metal sleeve 33 into the eye 28 of the bolster thrust link 24, still, due to the rigidity of the railway truck side frame bracket 25 and bolster bracket 26, novel means must be used to lock the inner metal sleeve 32 to its supporting frame member 7 or bolster member 21. Figs. 4 and 5 show the novel means used to lock the inner metal bushing sleeve 32 to its support member.

Considering first Figs. 4 and 6, it will be noted that the spaced apart walls or flanges 41, 42 of the bolster bracket 26 are each pierced by aligned bores 43, 44 respectively. Bores 43, 44 are adapted to receive the link pivot bolt 45. Pivot bolt 45 has a body portion 46 that matingly fits within the inner metal sleeve 32 of the link connector bushing. It will be noted that the inner metal sleeve 32 is of such a length that it extends outwardly beyond each end of the rubber sleeve 31, beyond the ends of the outer metal sleeve 33 and beyond the sides of the link eye 28. This outward extension of the bushing inner metal sleeve 32 is utilized, as explained hereafter, to provide bushing portions that can be anchored to the bolster frame 21 so that the bushing inner metal sleeve 32 can not rotate. To facilitate this anchoring of the bushing sleeve 32, the end edges 32a and 32b thereof may be serrated and hardened so that they will bite into the surfaces which they contact.

It will be noted that the head portion 47 of bolt 45 is considerably larger in diameter than the inner metal bushing sleeve 32 and thus the sleeve 32 seats against the underside of the bolt head 47. Accordingly, when the nut 48 is drawn up on the threaded end of the bolt shank 46 the bolt head 47 will be contracted against the end edge 32a of sleeve 32 and this will lock the bushing inner metal sleeve end 32b to the wall portion 42 of the bolster bracket 26 so that the bushing inner metal sleeve 32 cannot rotate or move in any manner.

To facilitate turning up the nuts 48 on the threaded bolt shanks 46, the outer end 47a of the bolt head 47 has an anchor bar 49 welded or otherwise rigidly fastened thereto. The anchor bar 49 projects outwardly beyond the periphery of the bolt head 47 so that it provides a pair of diametrically spaced anchor lugs for the bolt head 47. The annular flange 41a surrounding the bolt bore 43 on bracket wall 41 is notched at diametrically disposed portions to receive the outwardly projecting ends of the bolt head anchor bar 49. When the shank 46 of the bolt 45 is pushed through the aligned bores 43, 44 of the spaced bracket walls 42, 42 the bolt head 47 will slide partially through the wall bore 43 and the ends of the anchor bar 49 will seat in the notches 50 of the flange 41a. With the ends of the anchor bar 49 seated in the flange notches 50, the bolt 45 cannot rotate and then the nut 48 can be turned up on the threaded end of the bolt shank 46 to pull the bolt head 47 tightly against one end of the inner metal sleeve 32. This will lock the other end of sleeve 32 to the bracket wall 42 so that the sleeve 32 cannot rotate.

The bracket formation 25 on the frame wheel piece 7 (see Fig. 5) is similar to the bolster bracket 26 (Fig. 4) in that the spaced bracket walls 61, 62 are pierced by aligned bores that receive a bushing anchor bolt 45. The annular flange 61a of the wall 61 is notched at 50 to receive the ends of the bolt head anchor bar 49.

With the type of thrust link end connection hereinbefore described, it is thought to be obvious that thrusts longitudinally of the truck are firmly resisted by the highly compressed rubber-like sleeves 31 of the thrust link end bushing connections. The compressed rubber-like sleeves 31 have a very high resistance to direct radial loads. Relative vertical movement between bolster 21 and the frame 5 is readily permitted, within limits, of ±20 degrees due to the capacity of the rubber sleeves 31 to be distorted by shearing forces. With the outer metal sleeve 33 fixed to the link end eye 28, the inner metal sleeve 32 fixed to its support bracket by its pivot bolt 45, and the rubber-like sleeve 31 substantially fixed to each of the metal sleeves 32, 33 due to adhesion from compressive forces, it is obvious that shear forces will be set-up in the rubber-like sleeve 31 when the bolster 21 and frame 5 have relative vertical movement. Relative transverse or lateral movement between the bolster 21 and the frame 5 is permitted, within limits, of ±4 degrees due to the fact that the resistance to twist or conical compression of the rubber-like sleeves 31, when the thrust link rotates about a vertical axis, is much less than the direct compression loading of the sleeves 31 when a longitudinal thrust is applied to the thrust links. During relative transverse or lateral bolster movement it is essentially only the further compression of the pre-compressed resilient bushing material at the outer ends of the rubber-like sleeves 31 that effectively resists the relative lateral movement between the bolster 21 and the frame 5.

Figs. 10 and 11 show a modified form of means for anchoring the pivot bolts 45 against rotation. In the modified form of the pivot bolt anchor means shown in Figs. 10 and 11, the bracket wall 41' corresponds to the walls 41 and/or 61 of Figs. 4 and 5 and this wall is provided with a bolt head receiving bore 43'. At some point around the bore 43', preferably at a point in the horizontal plane of the link longitudinal centerline, a tapered keyway groove 44' is formed. The head 47' of the pivot bolt 45' is also formed with a keyway groove 46' that is adapted to be aligned with the keyway groove 44' in the bracket wall 41'. When the keyway grooves 44' and 46' are aligned, a gib-headed tapered key 49' is driven into the aligned keyway grooves 44', 46'. In the assembly of the pivot bolt 45' the key 49' is first loosely positioned in the keyway grooves 44', 46' to prevent relative rotation between the bolt 45' and its bracket bore 43'. The key 49' is left loose in the grooves 44', 46' until the bushing inner sleeve 32' is anchored in position by tightening the nut 48 on bolt 45' and thereafter the key 49' is driven home. The inner end of key 49' can be staked or bent to lock the key 49' in position. The tapered key 49' not only anchors the pivot bolt 45' against rotation but the taper of the key 49' also takes up any radial clearance between the bolt head 47' and its mating bracket wall bore 43'. This type of bolt anchor thus takes care of oversize clearance between the bolt head 47' and the bore 43' and also locks the pivot bolt 45' against rotation so that the nut 48 may be readily threaded on the associated pivot bolt 45'. This type of bolt anchor prevents working of the bolt 45' in its bracket bore 43' and this prevents wear from dynamic forces applied to the bolt.

I claim:

1. In a railway truck comprising a frame member and a bolster member resiliently supported on said frame member for relative movement with respect thereto; a bolster thrust link adapted to be pivotally connected between said frame member and said bolster member to substantially resist relative movement between the link connected members in a direction longitudinally of the link while permitting limited relative movement in other directions, said thrust link comprising an elongated rigid link with eye formations at each end providing bores that extend transversely through the link ends, resilient bushing units mounted in each eye bore, each bushing unit comprising a rigid outer sleeve fixedly mounted in the bore, a rigid inner sleeve concentrically arranged within and spaced from the outer sleeve, and a compressed resilient bushing mounted between said rigid inner and outer sleeves, said inner rigid sleeve having toothed portions extending beyond the sides of the link eye engageable with an associated member to provide means for anchoring the inner rigid sleeve against rotation, and an anchor bolt adapted to be supported on each of said members, each bolt having portions extending through the bore in the associated inner sleeve and having other portions arranged to apply force to the associated inner sleeve anchoring means to anchor the associated inner sleeve to its bolt supporting member.

2. In a railway truck comprising a frame member and a bolster member resiliently supported on said frame member for relative movement with respect thereto; a bolster thrust link adapted to be pivotally connected between said frame member and said bolster member to substantially resist relative movement between the link connected members in a direction longitudinally of the link while permitting limited relative movement in other directions, said thrust link comprising an elongated rigid link with eye formations at each end providing bores that extend transversely through the link ends, resilient bushing units mounted in each eye bore, each bushing unit comprising a rigid outer sleeve fixedly mounted in the bore, a rigid inner sleeve concentrically arranged within and spaced from the outer sleeve, and a compressed resilient bushing mounted between said rigid inner and outer sleeves, said inner rigid sleeve having serrated portions extending beyond the sides of the link eye engageable with an associated member to provide means for anchoring the inner rigid sleeve against rotation, and an anchor bolt adapted to be supported on each of said members, each bolt having portions extending through the bore in the associated inner sleeve and having other portions arranged to apply force to the associated inner sleeve anchoring means to anchor the associated inner sleeve to its bolt supporting member, said anchor bolt including means engageable with mating means on the bolt supporting member to prevent rotation of the bolt.

3. In a railway truck thrust link as set forth in claim 2 wherein the anchor bolt has a bar portion engageable with a slot on the bolt supporting member to prevent rotation of the bolt.

4. In a railway truck thrust link as set forth in claim 2 wherein the anchor bolt and a bolt receiving portion of the bolt supporting member are each formed with a keyway groove that receives a locking key to prevent rotation of the bolt.

5. For use in a railway truck with a truck frame having a bolster supported on said frame for movement relative to the frame; thrust link means for maintaining said bolster in spaced relationship to said frame comprising substantially U-shaped brackets on said frame and said bolster, a rigid link extending between said brackets having an eye portion at each end, one eye portion being positioned between the walls of each of said brackets, a resilient bushing unit mounted in each link eye portion comprising spaced, concentrically arranged, rigid, inner and outer sleeves having a compressed resilient bushing mounted between the inner and outer sleeves, one of said rigid sleeves being fixed to the link eye with the other of said rigid sleeves having serrated anchor portions extending beyond the sides of the link eye to provide means for anchoring said other sleeve to the associated bracket wall portions, and an anchor bolt mounted in and bridging the spaced walls of each bracket and having a shank portion mounting the other rigid sleeve of the associated bushing unit, each anchor bolt being arranged to force anchor portions on the associated other rigid sleeve into anchored engagement with the associated bracket member.

6. For use in a railway truck with a truck frame having a bolster supported on said frame for movement relative to the frame thrust link means for maintaining said bolster in spaced relationship to said spaced frame portions, comprising substantially U-shaped brackets on said frame and said bolster, a rigid link extending between said brackets having an eye portion at each end, one eye portion being positioned between the walls of each of said brackets, a resilient bushing unit mounted in each link eye portion comprising spaced, concentrically arranged, rigid, inner and outer sleeves having a compressed resilient bushing mounted between the inner and outer sleeves, one of said rigid sleeves being fixed to the link eye with the other of said rigid sleeves having toothed anchor portions extending beyond the sides of the link eye to provide means for anchoring said other sleeve to the associated bracket wall portions, and an anchor bolt mounted in and bridging the spaced walls of each bracket and having a shank portion mounting the other rigid sleeve of the associated bushing unit, each anchor bolt being arranged to force anchor portions on the associated other rigid sleeve into anchored engagement with the associated bracket member, said anchor bolts including key means engageable with the associated bracket to prevent bolt rotation.

7. A bolster thrust link adapted to be connected between a railway truck floating bolster and a portion of the associated truck frame to restrict relative movement between the link connected members in a direction lengthwise of the link while permitting resiliently controlled relative movement between the link connected members in other directions, said link comprising a rigid link having transverse bores piercing the link at each end, and a resilient bushing unit mounted in each bore comprising an outer rigid sleeve fixed in said bore, an inner rigid sleeve arranged concentrically within said outer rigid sleeve and spaced therefrom, and a compressed resilient bushing interconnecting the spaced sleeves, said inner rigid sleeve having toothed anchor portions extending outwardly from the sides of the link adapted to be anchored to the members connected by the link so that link rotation about the bore axis will be resisted by shear forces in the resilient bushing whereas forces applied longitudinally of the link will be resisted by direct radial compression of the precompressed resilient bushing.

8. A bolster thrust link adapted to be connected between a railway truck floating bolster and a portion of the associated truck to restrict relative movement between the link connected members in a direction lengthwise of the link while permitting resiliently controlled relative movement between the link connected members in other directions, said link comprising a rigid link having a bore piercing the link at its end, and a resilient bushing unit mounted in said link bore comprising an outer rigid sleeve fixed in said bore, an inner rigid sleeve arranged concentrically within said outer rigid sleeve and spaced therefrom, and a resilient bushing sleeve interconnecting the spaced inner and outer rigid sleeves, said inner rigid sleeve having outwardly extending serrated portions at each end thereof providing anchor portions adapted to be anchored to the member adapted to be connected to the link end so that rotation of the link about the bore axis will be resisted by shear forces in the resilient bushing sleeve whereas forces applied longitudinally of the link will be resisted by direct radial compression of the resilient bushing sleeve.

References Cited in the file of this patent

UNITED STATES PATENTS

| | | |
|---|---|---|
| 1,939,444 | Geyer | Dec. 12, 1933 |
| 1,954,277 | Zerk | Apr. 10, 1934 |
| 2,219,360 | Green | Oct. 29, 1940 |
| 2,251,258 | Alden et al. | Aug. 5, 1941 |
| 2,255,619 | Janeway | Sept. 9, 1941 |
| 2,324,997 | Brown | July 20, 1943 |
| 2,598,115 | Dodge | May 27, 1952 |
| 2,705,926 | Burdick | Apr. 12, 1955 |
| 2,740,360 | Janeway | Apr. 3, 1956 |
| 2,741,996 | Kolesa | Apr. 17, 1956 |
| 2,744,750 | Smith | May 8, 1956 |